(12) United States Patent
Nah et al.

(10) Patent No.: US 10,585,636 B2
(45) Date of Patent: Mar. 10, 2020

(54) MOBILE DEVICE AND METHOD FOR OPERATING MOBILE DEVICE

(71) Applicant: SAMSUNG ELECTRONICS CO., LTD., Suwon-si, Gyeonggi-do (KR)

(72) Inventors: Hyun-soo Nah, Seoul (KR); Sang-ok Cha, Suwon-si (KR); Seung-eok Choi, Suwon-si (KR); Won-young Choi, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 163 days.

(21) Appl. No.: 15/534,109

(22) PCT Filed: Jun. 9, 2015

(86) PCT No.: PCT/KR2015/005743
§ 371 (c)(1),
(2) Date: Jun. 8, 2017

(87) PCT Pub. No.: WO2016/093448
PCT Pub. Date: Jun. 16, 2016

(65) Prior Publication Data
US 2019/0087147 A1 Mar. 21, 2019

(30) Foreign Application Priority Data
Dec. 9, 2014 (KR) .................. 10-2014-0175874

(51) Int. Cl.
*G06F 3/14* (2006.01)
*G06F 3/048* (2013.01)
(Continued)

(52) U.S. Cl.
CPC ............ *G06F 3/1454* (2013.01); *G06F 3/041* (2013.01); *G06F 3/048* (2013.01);
(Continued)

(58) Field of Classification Search
CPC ............... G06F 3/1454; G06F 3/04883; G06F 3/04842; G06F 3/041; G06F 3/048;
(Continued)

(56) References Cited

U.S. PATENT DOCUMENTS

| 6,714,233 B2 | 3/2004 | Chihara et al. |
| 8,973,014 B2 | 3/2015 | Hsu et al. |

(Continued)

FOREIGN PATENT DOCUMENTS

| CN | 1404676 | 3/2003 |
| CN | 102866828 | 1/2013 |

(Continued)

OTHER PUBLICATIONS

Extended Search Report dated Jun. 7, 2018 in counterpart European Patent Application No. 15868434.0.
(Continued)

*Primary Examiner* — Jonathan A Boyd
(74) *Attorney, Agent, or Firm* — Nixon & Vanderhye, P.C.

(57) ABSTRACT

Provided is a mobile device including a touch screen display; one or more processors; and a memory, wherein the one or more processors control the touch screen display to display an execution screen image of an application, receive a user input on or nearby the touch screen display, and, based on the user input, and transmit the execution screen image of the application to a wearable device connected via a communication link.

7 Claims, 11 Drawing Sheets

(51) Int. Cl.
*G06F 3/041* (2006.01)
*H04M 1/725* (2006.01)
*G06F 3/0484* (2013.01)

(52) U.S. Cl.
CPC ...... *G06F 3/04842* (2013.01); *H04M 1/7253* (2013.01); *H04M 1/72555* (2013.01); *H04M 2250/02* (2013.01); *H04M 2250/22* (2013.01)

(58) Field of Classification Search
CPC ........... H04M 1/7253; H04M 1/72555; H04M 2250/22; H04M 2250/02; Y10S 707/913
See application file for complete search history.

(56) References Cited

U.S. PATENT DOCUMENTS

| | | | |
|---|---|---|---|
| 9,047,003 | B2 | 6/2015 | Lee et al. |
| 2002/0068600 | A1 | 6/2002 | Chihara et al. |
| 2010/0085318 | A1* | 4/2010 | Lee ................ G06F 3/04883 345/173 |
| 2011/0157046 | A1 | 6/2011 | Lee et al. |
| 2012/0108215 | A1 | 5/2012 | Kameli |
| 2013/0219072 | A1 | 8/2013 | Han et al. |
| 2014/0085218 | A1 | 3/2014 | Lee |
| 2014/0125554 | A1 | 5/2014 | Pan et al. |
| 2014/0298353 | A1 | 10/2014 | Hsu et al. |
| 2015/0186095 | A1 | 7/2015 | Dong et al. |
| 2018/0067904 | A1 | 3/2018 | Li |

FOREIGN PATENT DOCUMENTS

| | | | | |
|---|---|---|---|---|
| CN | 103324457 | | 9/2013 | |
| CN | 103500066 | | 1/2014 | |
| CN | 20131460374 | * | 1/2014 | ........... G06F 3/0484 |
| CN | 103701927 | | 4/2014 | |
| CN | 104077253 | | 10/2014 | |
| CN | 104126310 | | 10/2014 | |
| EP | 1 109 139 | | 6/2001 | |
| EP | 1109139 A2 | * | 6/2001 | ............ G08B 5/228 |
| KR | 10-2010-0037945 | | 4/2010 | |
| KR | 10-2011-0107058 | | 9/2011 | |
| KR | 10-2013-0095519 | | 8/2013 | |
| KR | 10-2013-0101801 | | 9/2013 | |

OTHER PUBLICATIONS

Search Report and Written Opinion dated Jul. 30, 2015 in counterpart International Patent Application No. PCT/KR2015/005743 and English-language translations of same.

Office Action dated Nov. 28, 2019 in counterpart Chinese Patent Application No. 201580076019.7 and English-language translation.

* cited by examiner

MOBILE DEVICE AND METHOD FOR OPERATING MOBILE DEVICE

CROSS-REFERENCE TO RELATED APPLICATIONS

This application is the U.S. national phase of International Application No. PCT/KR2015/005743 filed Jun. 9, 2015 which designated the U.S. and claims priority to KR Patent Application No. 10-2014-0175874 filed Dec. 9, 2014, the entire contents of each of which are hereby incorporated by reference.

TECHNICAL FIELD

The present invention relates to a mobile device and a method of operating the mobile device.

BACKGROUND ART

A mobile device, such as a smart phone, a tablet, or a laptop computer, may communicate with other devices via wire or wirelessly. A mobile device may transmit data to other devices and receive data from other devices. A mobile device may operate in conjunction with other devices.

A user may simultaneously use at least two devices. Two or more devices may establish a convenient user environment, and a user may execute an application or a program on two or more devices.

DETAILED DESCRIPTION OF THE INVENTION

Technical Problem

Provided are a method and an apparatus for displaying an application, which is being executed on a mobile device, on another device.

Technical Solution

According to an aspect of the present invention, a mobile device includes a touch screen display; one or more processors; and a memory, wherein the one or more processors control the touch screen display to display an execution screen image of an application, receive a user input on or nearby the touch screen display, and, based on the user input, and transmit the execution screen image of the application to a wearable device connected via a communication link.

According to another aspect of the present invention, a mobile device includes a touch screen display; one or more processors; and a memory, wherein the one or more processors execute the application, receive a user input on or nearby the touch screen display, and transmit data regarding the application selected based on the user input to a wearable device connected via a communication link.

According to another aspect of the present invention, a wearable device includes a display; one or more processors; and a memory, wherein the one or more processors receive an execution screen image of an application being executed on a mobile device connected via a communication link from the mobile device and displays the execution screen image on the display.

According to another aspect of the present invention, a wearable device includes a display; one or more processors; and a memory, wherein the one or more processors receive data regarding an application being executed on a mobile device connected via a communication link is received from the mobile device, execute the application, and display an execution screen image of the application.

According to another aspect of the present invention, a method of operating a mobile device, the method includes displaying an execution screen image of an application on a touch screen display; receiving a user input on or nearby the touch screen display; and, based on the user input, transmitting the execution screen image of the application to a wearable device connected via a communication link.

According to another aspect of the present invention, a method of operating a mobile device, the method includes executing an application and displaying an execution screen image of the application on a touch screen display; receiving a user input on or nearby the touch screen display; and transmitting data regarding an application selected based on the user input to a wearable device connected via a communication link.

MODE OF THE INVENTION

Figure 1:
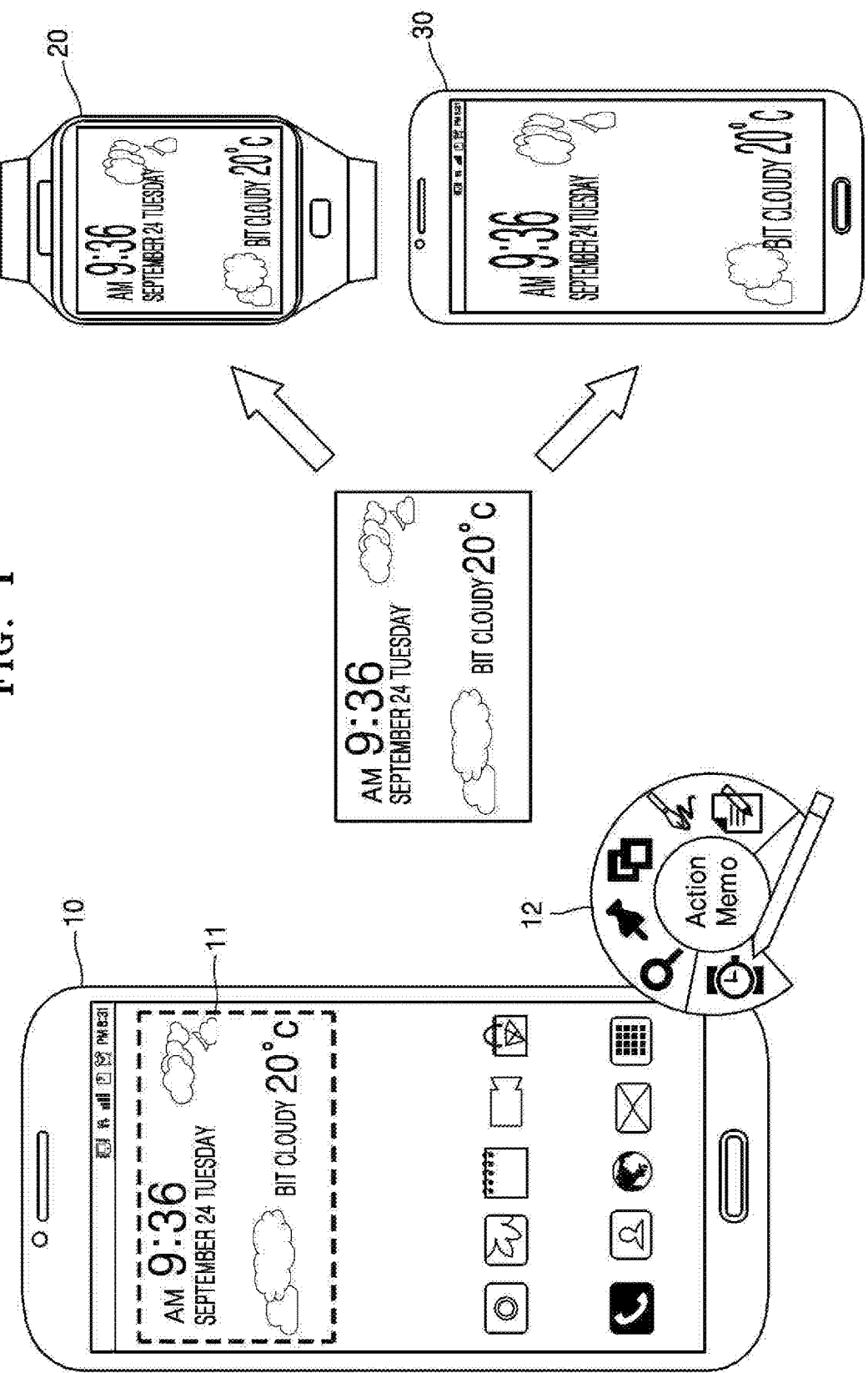
FIG. 1 is a diagram for describing a method of operating devices according to an embodiment.

FIG. 1 is a diagram for describing a method of operating devices according to an embodiment. Referring to FIG. 1, a second or third device 20 or 30 may display data or an image identical to that displayed by a first device 10.

The first device 10 displays an execution screen image of an application (a screen image of executing an application) on a touch screen display. The first device 10 may execute not only an application, but also various programs and widgets. The first device 10 may display an execution screen image of a program or a widget.

The first device 10 receives a user input on or near the touch screen display. A user may input a gesture for selecting a specific region 11 of the touch screen display. The first device 10 determines the region 11 to be selected by a user based on a gesture of the user.

When the region 11 is selected, the first device 10 displays a menu 12. A user may select any one of the menus 12 displayed on the first device 10. When the user selects a menu for transmitting data to the second or third device 20 or 30 from among the menus 12, the first device 10 may transmit an execution screen image or image data displayed by the selected region 11 to second or third device 20 or 30.

The second device 20 or the third device 30 displays an execution screen image or image data received from the first device 10. The second device 20 is an example of wearable devices and the third device 30 is an example of mobile devices. The first through third devices 10 through 30 are devices that may communicate via a wire or wirelessly.

Figure 2:
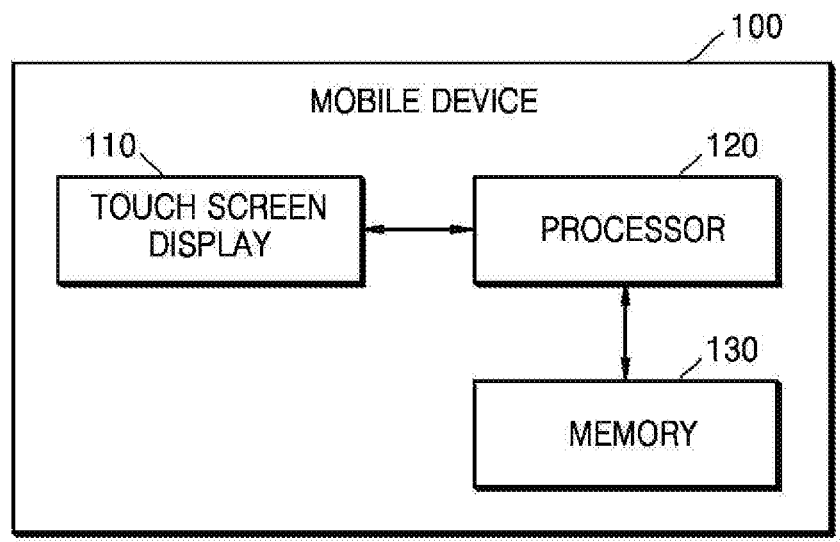
FIG. 2 is a schematic diagram showing a mobile device according to an embodiment.

FIG. 2 is a schematic diagram showing a mobile device according to an embodiment. Referring to FIG. 2, a mobile device 100 includes a touch screen display 110, a processor 120, and a memory 130. The mobile device 100 may transmit an execution screen image or image data of an application to another device connected through a communication link based on a user input received via the touch screen display 110.

The mobile device 100 represents an electronic device that may be carried by a user, such as a mobile phone, a tablet, a wearable device, and a laptop computer.

The touch screen display 110 detects a user input. A user may input a gesture to the touch screen display 110 by using a finger, a touch pen, etc. The touch screen display 110 transmits a detected input to the processor 120.

The processor 120 controls the touch screen display 110 to display an execution screen image of an application on the touch screen display 110. The processor 120 controls the touch screen display 110 to display an execution screen image or a basic screen image of an application currently being executed on the touch screen display 110. The processor 120 may control the touch screen display 110 to display a clock, an alarm, a game, a movie, etc. on the touch screen display 110.

The processor 120 receives a user input on or near the touch screen display 110. A user input may be a gesture indicating a specific region. When a user input forms a closed loop, the processor 120 transmits an execution screen image inside the closed loop. The closed loop may have a circular shape or a polygonal shape. Alternatively, when a user input forms a closed loop, the processor 120 may control the touch screen display 110 to display the menu 12.

The processor 120 transmits an execution screen image of an application to another device connected via a communication link based on a user input. The processor 120 transmits only an execution screen image of a region designated by a user to another device. The processor 120 may convert an execution screen image into image data and transmit the image data. Furthermore, the processor 120 may transmit information regarding an application being executed at the time point at which a user input is received to another device, so that another device may execute the application. When an execution screen image is updated, the processor 120 transmits the updated execution screen image.

The processor 120 transmits an execution screen image to a device even when an application enters a background state. When an application enters the background state, no execution screen image of the application is displayed on the touch screen display 110, but the application is being executed. The processor 120 may transmit an execution screen image of an application to other devices even when no execution screen image of the application is displayed on the touch screen display 110.

The memory 130 may store data to be processed by the processor 120 or may store a program to be executed by the processor 120.

Figure 3:
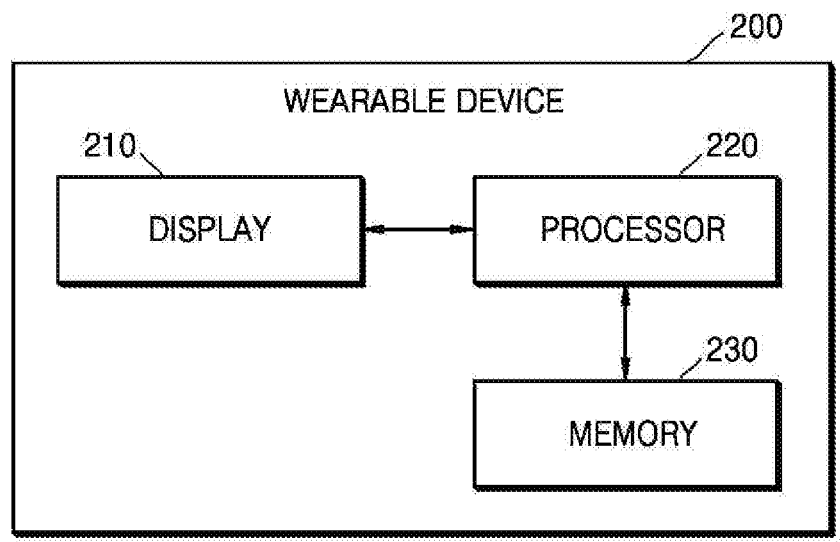
FIG. 3 is a schematic diagram showing a wearable device according to an embodiment.

FIG. 3 is a schematic diagram showing a wearable device according to an embodiment. Referring to FIG. 3, a wearable device 200 includes a display 210, a processor 220, and a memory 230. The wearable device 200 displays an execution screen image received from the mobile device 100. The wearable device 200 may be not only an electronic device that may be worn on a user's body such as a smart watch or a smart glass, but also an electronic device that may be carried by a user such as a mobile phone, a tablet, or a laptop computer.

The wearable device 200 and the mobile device 100 are connected to each other via a communication link. For example, the wearable device 200 and the mobile device 100 may be connected to each other via a wire or a wireless communication link.

The processor 220 receives an execution screen image of an application from the mobile device 100. The processor 220 may receive an execution screen image of an application in the form of image data or information regarding the application from the mobile device 100.

The processor 220 displays the received execution screen image on the display 210. When image data is received, the processor 220 transmits the image data to the display 210. When the processor 220 receives information regarding an application, the processor 220 executes the application and displays the application on the display 210. The information regarding an application may be identification information, such as a name for identifying the application, or content to be displayed when the application is executed.

The display 210 is controlled by the processor 220 and displays data or an image.

The memory 230 may store data to be processed by the processor 220 or may store a program to be executed by the processor 220. Alternatively, the memory 230 may store data or information received from the mobile device 100.

Figure 4:
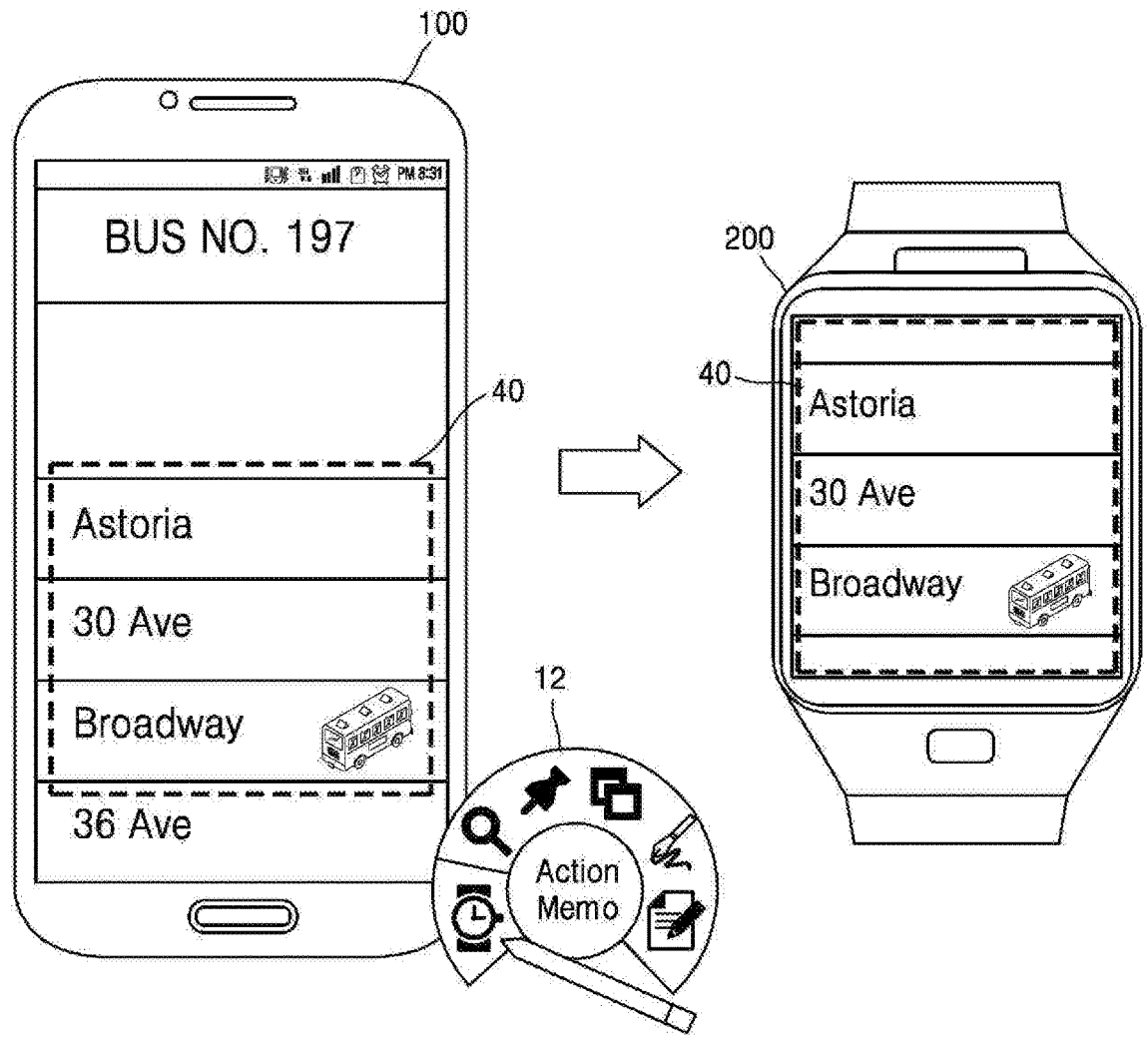
FIG. 4 is a diagram showing a method of clipping real-time bus information by a mobile device according to an embodiment.

FIG. 4 is a diagram showing a method of clipping real-time bus information by a mobile device according to an embodiment. Referring to FIG. 4, the wearable device 200 may display a region 40 clipped or selected on the mobile device 100

The mobile device 100 executes an application for displaying real-time bus information. For example, the mobile device 100 may display a screen image indicating the location of a bus No. 197. The mobile device 100 may indicate bus stops where the bus No. 197 stops and a current location of the bus No. 197. FIG. 4 shows that the bus No. 197 is currently stopped at Broadway.

The mobile device 100 receives the region 40 that the user desires to display on the wearable device 200. For example, the user may select the region 40. The region 40 includes three stops (Astoria, 30 Ave, and Broadway). The mobile device 100 transmits data or an image displayed in the selected region 40 to the wearable device 200.

The mobile device 100 may update data or an image displayed in the region 40 and transmits the updated data or the updated image to the wearable device 200. The mobile device 100 may transmit updated data or an updated image to the wearable device 200 every time data or an image displayed in the region 40 is updated.

The wearable device 200 displays data or an image received from the mobile device 100. For example, in FIG. 4, the wearable device 200 displays the region 40 received from the mobile device 100. The wearable device 200 displays data or an image on the display 210 every time data or an image is received from the mobile device 100. Therefore, a user may monitor contents displayed on the mobile device 100 in real time by using the wearable device 200.

Figure 5:
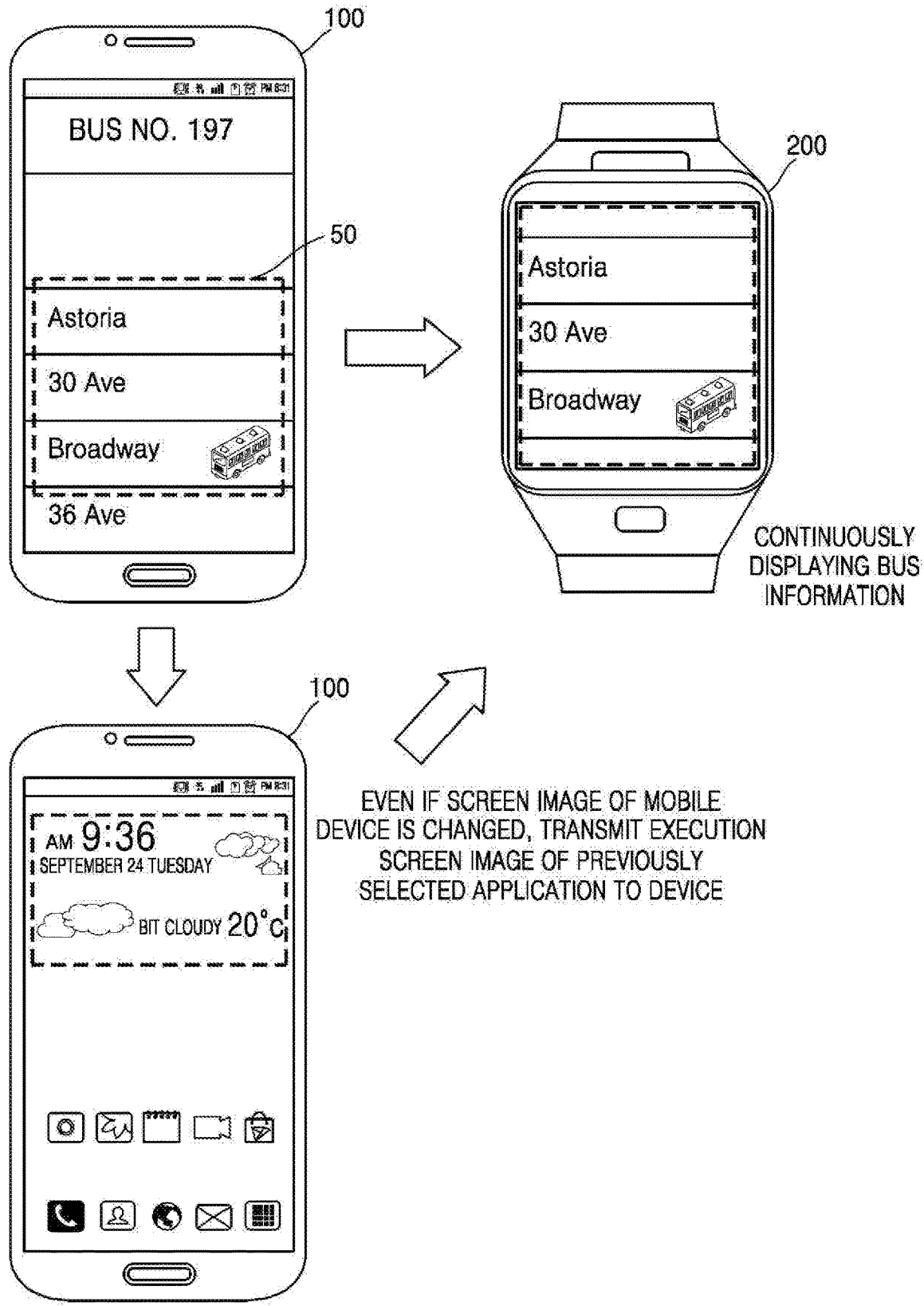
FIG. 5 is a diagram for describing how a mobile device according to an embodiment transmits an execution screen image in a background state.

FIG. 5 is a diagram for describing how a mobile device according to an embodiment transmits an execution screen image in the background state. Referring to FIG. 5, even when the application selected by a user is in the background state, the mobile device 100 transmits an execution screen image of the application to the wearable device 200 in real time.

FIG. 5 is a diagram showing a case where the mobile device 100 switches an application to the background state. When an application is switched to the background state, the application is being executed, but the application is not displayed.

FIG. 5 shows an example in which the mobile device 100 displays a desktop screen while displaying real time bus information. When a user does not terminate an application for displaying bus information, real time bus information is switched to the background state, and the application for displaying bus information is continuously executed. When the user executes another application by using the mobile device 100 and does not terminate a previous application, the previous application is continuously executed. Accordingly, the mobile device 100 does not display an execution screen image of the previous application on the touch screen display 110 of the mobile device 100, but transmits an image of a region 50 in an execution screen image of the previous application to the wearable device 200. Therefore, the wearable device 200 may continuously display bus information.

Figure 6:
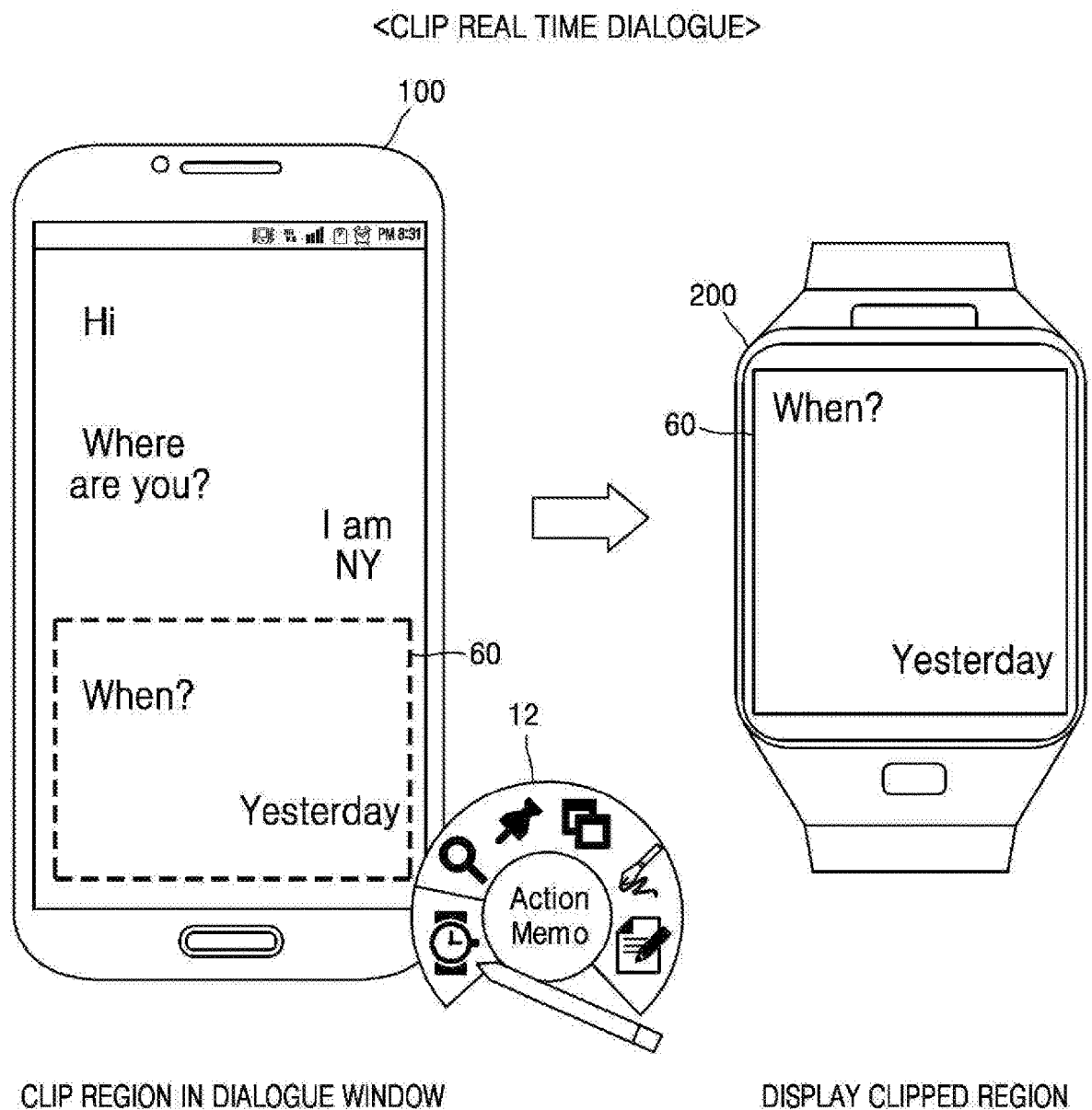
FIG. 6 is a diagram showing a method of clipping a real-time dialogue by a mobile device according to an embodiment.

FIG. 6 is a diagram showing a method of clipping a real-time dialogue by mobile device according to an embodiment. Referring to FIG. 6, the wearable device 200 may display a region 60 clipped from a dialogue displayed on the mobile device 100.

The mobile device 100 displays a real-time conversation. A user may execute an application, such as a messenger or a program for sending a message. The user may communicate with another party via a messenger or the like.

The user may select the region 60 to clip in a dialogue window. The mobile device 100 receives a user input and detects the region 60 that the user wants to clip. After selecting the region 60, the user may request to transmit data or an image displayed in the selected region 60 to the wearable device 200. The mobile device 100 transmits data or an image displayed in the region 60 to the wearable device 200 according to a request of the user.

The wearable device 200 displays data or an image received from the mobile device 100. Therefore, the user may monitor contents displayed in the dialog window of the mobile device 100 through the wearable device 200 in real time.

Figure 7:
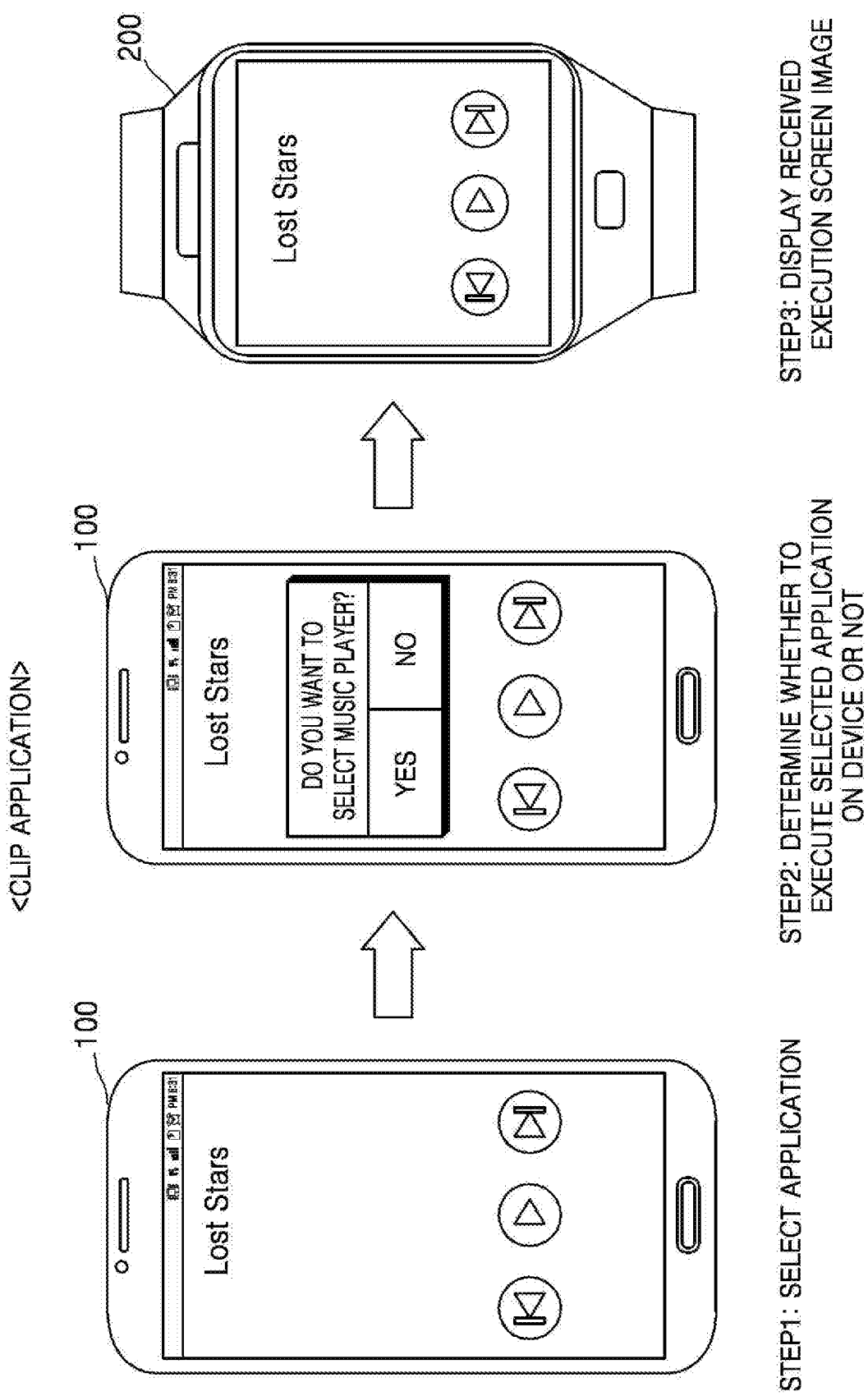
FIG. 7 is a diagram for describing a method by which a wearable device displays an application executed by a mobile device according to an embodiment.

FIG. 7 is a diagram for describing a method by which a wearable device displays an application executed by a mobile device according to an embodiment. Referring to FIG. 7, the mobile device 100 may transmit a control signal to the wearable device 200, such that an application selected by a user is executed on the wearable device 200.

The mobile device 100 executes an application and selects the application being executed according to a user input. The user may select the application currently being executed via the touch screen display 110.

The mobile device 100 may display a pop-up window indicating whether to select an application currently being executed. Furthermore, the mobile device 100 determines whether to execute the application on the wearable device 200 according to a user input. The user may determine whether to execute the application by touching a Yes region and a No region displayed in the pop-up window.

The mobile device 100 may transmit information regarding the application and information indicating the current state of the application to the wearable device 200. The mobile device 100 may also transmit data or a control signal to the wearable device 200, such that the wearable device 200 performs a same operation as the mobile device 100. For example, when the user selects a music player, the mobile device 100 may transmit a control signal indicating that the music player is selected and instructing the wearable device 200 to execute the music player to the wearable device 200. When the music player is not installed on the wearable device 200, the mobile device 100 may transmit an install program of the music player to the wearable device 200. The mobile device 100 transmits information regarding currently playing music to the wearable device 200 and transmits a control signal to the wearable device 200, such that the wearable device 200 plays music same as that being played on the mobile device 100. The mobile device 100 may transmit music to the wearable device 200 when the music is not stored in the wearable device 200.

The wearable device 200 executes an application and displays an execution screen image of the application based on information received from the mobile device 100. Furthermore, the wearable device 200 may play music being played on the mobile device 100.

Figure 8:
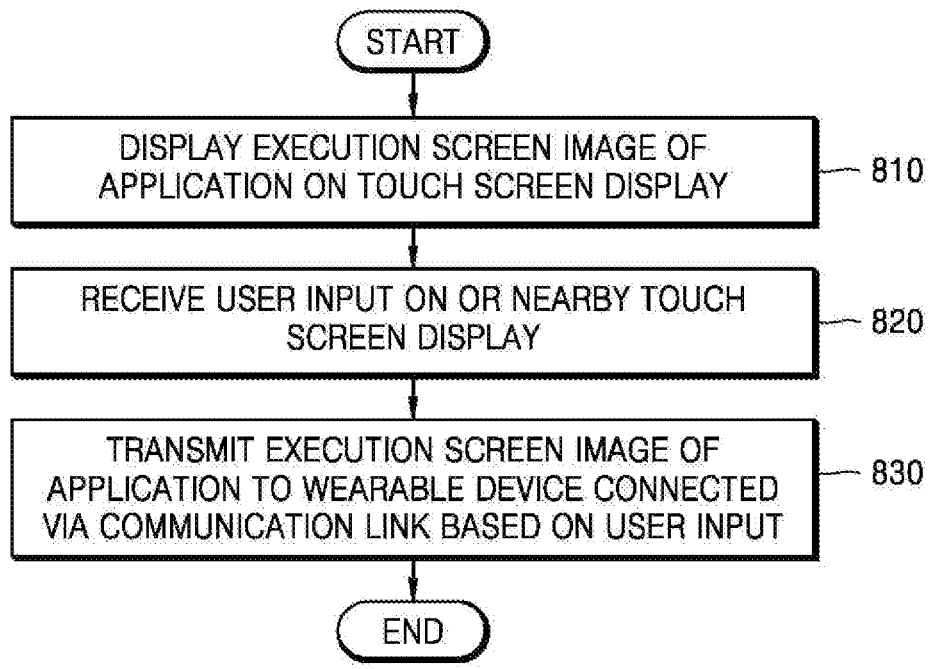
FIG. 8 is a flowchart showing a method of operating a mobile device according to an embodiment.

FIG. 8 is a flowchart showing a method of operating a mobile device according to an embodiment.

In operation 810, the mobile device 100 displays an execution screen image of an application on the touch screen display 110.

In operation 820, the mobile device 100 receives a user input on or near the touch screen display 110. A user may select a specific region of the touch screen display 110. The mobile device 100 may display a menu when the touch of the user is completed. The menu represents function corresponding to user inputs. The user selects a desired function from among the menus.

In operation 830, based on a user input, the mobile device 100 transmits an execution screen image of the application to the wearable device 200 that is connected to the mobile device 100 via a communication link. When a function selected by a user is a function for clipping a selected region, the mobile device 100 transmits an execution screen image displayed in the selected region to the wearable device 200.

The mobile device 100 transmits an image or a text to the wearable device 200 and controls the wearable device 200 to display the image or the text.

Figure 9:
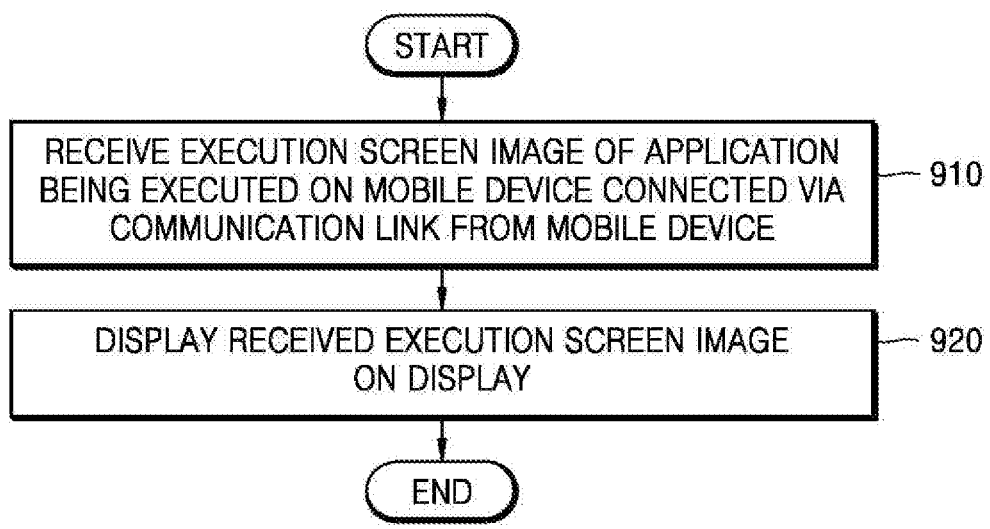
FIG. 9 is a flowchart of a method of operating a wearable device according to an embodiment.

FIG. 9 is a flowchart of a method of operating a wearable device according to an embodiment.

In operation 910, the wearable device 200 receives an execution screen image of an application being executed on the mobile device 100 from the mobile device 100 connected via a communication link. For example, the wearable device 200 may receive an image or a text. When an image or a text is updated, the mobile device 100 transmits the updated image or the updated text to the wearable device 200.

In operation 920, the wearable device 200 displays the received execution screen image on the display 210. The wearable device 200 displays an image or a text on the display 210 and, when an updated image or an updated text is received, displays the updated image or the updated text.

Figure 10:
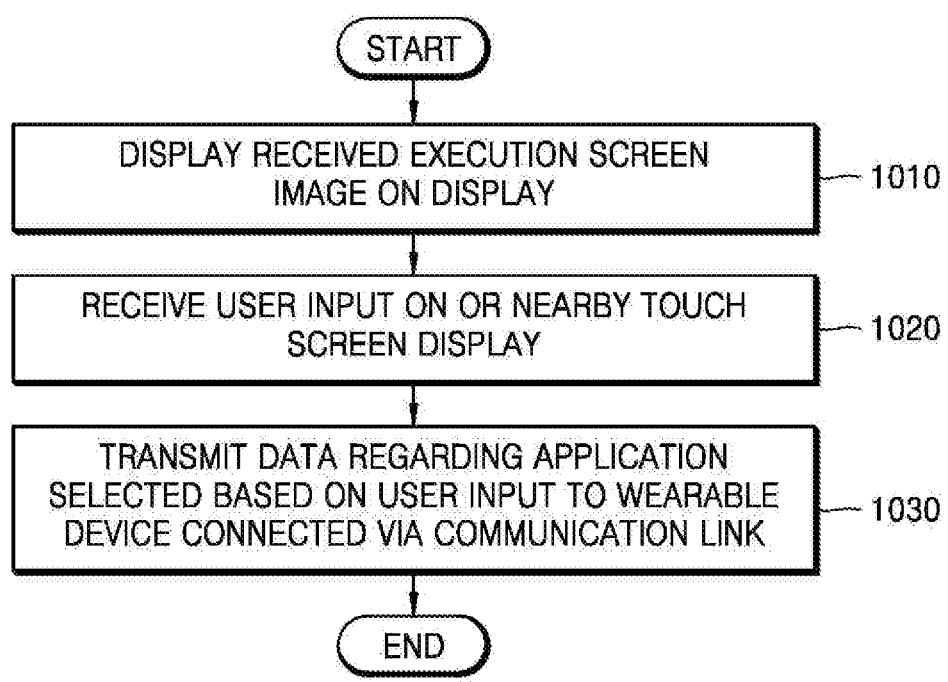
FIG. 10 is a flowchart of a method of operating a mobile device according to an embodiment.

FIG. 10 is a flowchart of a method of operating a mobile device according to an embodiment.

In operation 1010, the mobile device 100 executes an application and displays an execution screen image thereof on the touch screen display 110.

In operation 1020, the mobile device 100 receives a user input on or near the touch screen display 110. The user may select an application being executed. The mobile device 100 identifies the application selected by the user.

In operation 1030, the mobile device 100 transmits data regarding the application selected based on a user input to the wearable device 200 connected via a communication link. The mobile device 100 may transmit the name, identification information, and download information regarding the application to the wearable device 200. Furthermore, the mobile device 100 may transmit a program to the wearable device 200, such that wearable device 200 installs the application. The mobile device 100 may transmit information indicating an execution state of the application to the wearable device 200. In other words, the mobile device 100 may transmit an image currently displayed by the application and data processed after the application is executed to the wearable device 200.

Figure 11:
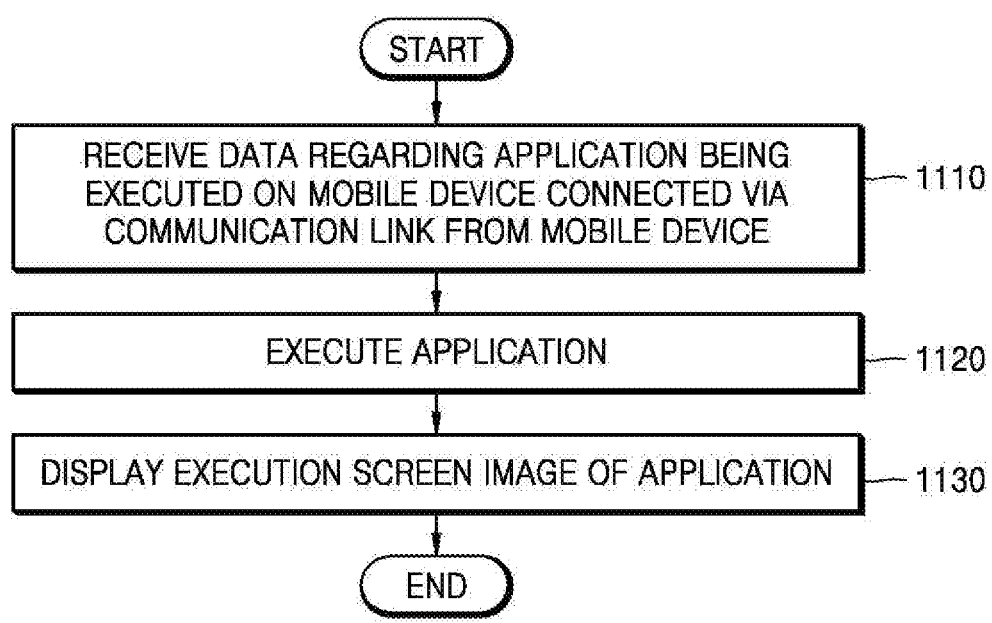
FIG. 11 is a flowchart showing a method of operating a wearable device according to an embodiment.

FIG. 11 is a flowchart showing a method of operating a wearable device according to an embodiment.

In operation 1110, the wearable device 200 receives data regarding an application being executed on the mobile device mobile device 100 connected via a communication link from the mobile device 100.

In operation 1120, the wearable device 200 executes the application. When the application is not installed, the wearable device 200 may download the application from a server by referring to the data regarding the application. Furthermore, the wearable device 200 may receive a program from the mobile device 100 and install the application.

In operation 1130, the wearable device 200 displays an execution screen image of the application. The wearable device 200 may display the same execution screen image as that displayed on the mobile device 100 by referring to data received from the mobile device 100.

The wearable device 200 according to an embodiment may display a same execution screen image as that displayed on the mobile device 100.

The mobile device 100 according to an embodiment may transmit an image or a text displayed in a region designated by a user to the wearable device 200.

The device described herein may comprise a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable recording medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor.

The present invention may be described in terms of functional block components and various processing steps. Such functional blocks may be realized by any number of hardware and/or software components configured to perform the specified functions. For example, the present invention may employ various integrated circuit (IC) components, e.g., memory elements, processing elements, logic elements, look-up tables, and the like, which may carry out a variety of functions under the control of one or more microprocessors or other control devices. Similarly, where the elements of the present invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the present invention could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The present invention is not limited to the described order of the steps. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to one of ordinary skill in the art without departing from the spirit and scope of the present invention.

The invention claimed is:

1. A mobile device comprising:
a touch screen display;
one or more processors; and
a memory,
wherein the one or more processors are configured to:
control the touch screen display to display a first execution screen image of a currently executing first application;
receive a user input on the touch screen display, and, when the user input forms a closed loop, control transmitting only a region included in the closed loop being a portion of the first execution screen image to a wearable device connected to the mobile device via a communication link; and when the touch screen display displays a second execution screen image of a currently executing second application, while the first application continues executing without the first execution screen being displayed on the touchscreen display, control transmitting, whenever the region in the closed loop of the first execution screen image is updated, the updated region to the wearable device via the communication link.

2. The mobile device of claim 1,
wherein the one or more processors are configured to execute the first application, and control transmitting data regarding the first application selected based on the user input to the wearable device connected to the mobile device via the communication link.

3. The mobile device of claim 1, wherein the one or more processors are configured to execute the first application, and control transmitting data regarding the first application selected based on the user input to the wearable device connected to the mobile device via the communication link.

4. A method of operating a mobile device, the method comprising:
displaying a first execution screen image of a currently executing first application on a touch screen display;
receiving a user input on the touch screen display and, when the user input forms a closed loop, transmitting only a region included in the closed loop being a portion of the first execution screen image to a wearable device connected to the mobile device via a communication link; and
when the touch screen display displays a second execution screen image of a currently executing second application, while the first application continues executing without the first execution screen being displayed on the touchscreen display, control transmitting, whenever the region in the closed loop of the first execution screen image is updated, the updated region to the wearable device via the communication link.

5. The method of claim 4, further comprising:
executing the first application, and
transmitting data regarding the first application selected based on the user input to the wearable device connected to the mobile device via the communication link.

6. The method of claim 4, further comprising: executing the first application, and transmitting data regarding the first application selected based on the user input to the wearable device connected to the mobile device via the communication link.

7. A non-transitory computer readable recording medium comprising instructions which, when executed by a mobile device, cause the mobile device to:
display a first execution screen image of a currently executing first application on a touch screen display;
receive a user input on the touch screen display and, when the user input forms a closed loop, transmitting only a region included in the closed loop being a portion of the first execution screen image to a wearable device connected to the mobile device via a communication link; and
when the touch screen display displays a second execution screen image of a currently executing second application, while the first application continues executing without the first execution screen being displayed on the touchscreen display, control transmitting, whenever the region in the closed loop of the first execution screen image is updated, the updated region to the wearable device via the communication link.

* * * * *